(12) United States Patent
Weiland

(10) Patent No.: US 9,494,401 B2
(45) Date of Patent: Nov. 15, 2016

(54) INSPECTION APPARATUSES, SYSTEMS, AND METHODS

(71) Applicant: The Boeing Company, Chicago, IL (US)

(72) Inventor: Gregory J. Weiland, Kent, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 14/592,467

(22) Filed: Jan. 8, 2015

(65) Prior Publication Data

US 2016/0202034 A1    Jul. 14, 2016

(51) Int. Cl.
*G01B 3/38*    (2006.01)
(52) U.S. Cl.
CPC ....................... *G01B 3/38* (2013.01)
(58) Field of Classification Search
CPC .......................................................... G01B 3/38
USPC ................... 33/542, 543, 546, 550, 551, 552
See application file for complete search history.

(56) References Cited

U.S. PATENT DOCUMENTS

| | | | | |
|---|---|---|---|---|
| 2,312,222 A * | 2/1943 | Tanner | .................. | G01B 5/08 122/7 R |
| 2,795,049 A * | 6/1957 | Eisele | .................. | G01B 5/14 33/501.4 |
| 3,225,447 A * | 12/1965 | Bryant | .................. | G01B 3/22 33/502 |
| 4,045,877 A * | 9/1977 | Rutter | .................. | G01B 5/12 33/542 |
| 4,367,592 A | 1/1983 | Thompson | | |
| 4,530,161 A * | 7/1985 | Blankinship | ............. | G01B 7/13 33/544.2 |
| 4,901,445 A * | 2/1990 | Boissevain | ............ | G01B 7/107 33/501.02 |
| 5,075,979 A * | 12/1991 | Foskett | .................. | G01B 7/107 324/231 |
| 2006/0090363 A1* | 5/2006 | Luner | .................. | G01B 3/28 33/833 |
| 2009/0113734 A1* | 5/2009 | Matsumiya | ............ | G01B 3/205 33/505 |

* cited by examiner

*Primary Examiner* — G. Bradley Bennett
(74) *Attorney, Agent, or Firm* — Kunzler Law Group, PC

(57) ABSTRACT

An apparatus (102) for positioning a measurement caliper (138) relative to an exterior surface (190) of a tube (154) for inspecting an interior surface (155) of the tube (154) is disclosed. The apparatus (102) comprises a chassis (104) configured to be coupled to the measurement caliper (138). The apparatus (102) also comprises a component (106) configured to extend from the chassis (104). The component (106) comprises a cylindrical alignment surface (122) defining a cavity (107). The cylindrical alignment surface (122) has a second rotational-symmetry axis (123). When the measurement caliper (138) is coupled to the chassis, measurement arms (146) of the measurement caliper (138) protrude at least partially through the cavity (107) of the component (106) and the second rotational-symmetry axis (123) of the cylindrical alignment surface (122) of the component (106) is coplanar with a measurement plane (180) defined by the measurement arms (146) of the measurement caliper (138).

20 Claims, 12 Drawing Sheets

CONTINUED TO FIG. 13B

INSPECTION APPARATUSES, SYSTEMS, AND METHODS

BACKGROUND

Dimensional inspection of interior surfaces of tubes for quality-assurance purposes is a routine step of the manufacturing process. Inspection accuracy depends on proper alignment between the tube and the measurement instrument, which is difficult to achieve with a hand-held measurement caliper. Further, tubes with swaged joints present additional quality-control challenges when dimensional inspection is used to determine whether a quality swaged joint has been achieved.

SUMMARY

Accordingly, apparatuses and methods, intended to address the above-identified concerns, would find utility.

The following is a non-exhaustive list of examples, which may or may not be claimed, of the subject matter according the present disclosure.

One example of the present disclosure relates to an apparatus for positioning a measurement caliper relative to an exterior surface of a tube for inspecting an interior surface of the tube. The interior surface of the tube has a first rotational-symmetry axis. The measurement caliper comprises measurement arms defining a measurement plane and a measurement axis in the measurement plane. The apparatus comprises a chassis configured to be coupled to the measurement caliper so that the chassis is rotatable relative to the measurement caliper about a rotation axis perpendicular to the measurement plane and is configured to be fixed relative to the measurement caliper along the rotation axis and along the measurement axis, defined by the measurement arms of the measurement caliper. The apparatus also comprises a component configured to extend from the chassis. The component comprises a cylindrical alignment surface defining a cavity. The cylindrical alignment surface has a second rotational-symmetry axis. With the chassis coupled to the measurement caliper and the component extending from the chassis, the measurement arms of the measurement caliper protrude at least partially through the cavity of the component and the second rotational-symmetry axis of the cylindrical alignment surface of the component is coplanar with the measurement plane defined by the measurement arms of the measurement caliper.

Another example of the present disclosure relates to a system for inspecting an interior surface of a tube. The interior surface has a first rotational-symmetry axis. The system comprises a measurement caliper, in turn comprising a body and measurement arms coupled to the body and defining a measurement plane and a measurement axis in the measurement plane. The body comprises a circular face portion. The system further comprises a chassis coupled to the measurement caliper so that the chassis is rotatable relative to the measurement caliper about a rotation axis perpendicular to the measurement plane and is fixed relative to the measurement caliper along the rotation axis and along the measurement axis, defined by the measurement arms coupled to the body of the measurement caliper. Additionally, the system comprises a component extending from the chassis. The component comprises a cylindrical alignment surface defining a cavity. The cylindrical alignment surface has a second rotational-symmetry axis. The measurement arms of the measurement caliper protrude at least partially through the cavity of the component and the second rota-tional-symmetry axis of the cylindrical alignment surface of the component is coplanar with the measurement plane defined by the measurement arms of the measurement caliper.

Yet another example of the present disclosure relates to a method of inspecting an interior surface of a tube. The interior surface has a first rotational-symmetry axis. The method comprises providing a chassis coupled to a measurement caliper so that the chassis is rotatable relative to the measurement caliper about a rotation axis perpendicular to a measurement plane defined by measurement arms of the measurement caliper and is fixed relative to the measurement caliper along the rotation axis and along a measurement axis, defined by the measurement arms of the measurement caliper. The measurement axis is in the measurement plane. The method further comprises providing a component extending from the chassis. The component comprises a cylindrical alignment surface defining a cavity. The cylindrical alignment surface has a second rotational-symmetry axis. The measurement arms of the measurement caliper protrude at least partially through the cavity of the component and the second rotational-symmetry axis of the cylindrical alignment surface is coplanar with the measurement plane defined by the measurement arms of the measurement caliper. Additionally, the method comprises inserting the measurement arms of the measurement caliper into the tube. The method also comprises causing the first rotational-symmetry axis of the interior surface of the tube and the measurement plane defined by the measurement arms of the measurement caliper to be coplanar by aligning the second rotational-symmetry axis of the cylindrical alignment surface of the component with the first rotational-symmetry axis of the interior surface of the tube.

BRIEF DESCRIPTION OF THE DRAWINGS

Figure 1:
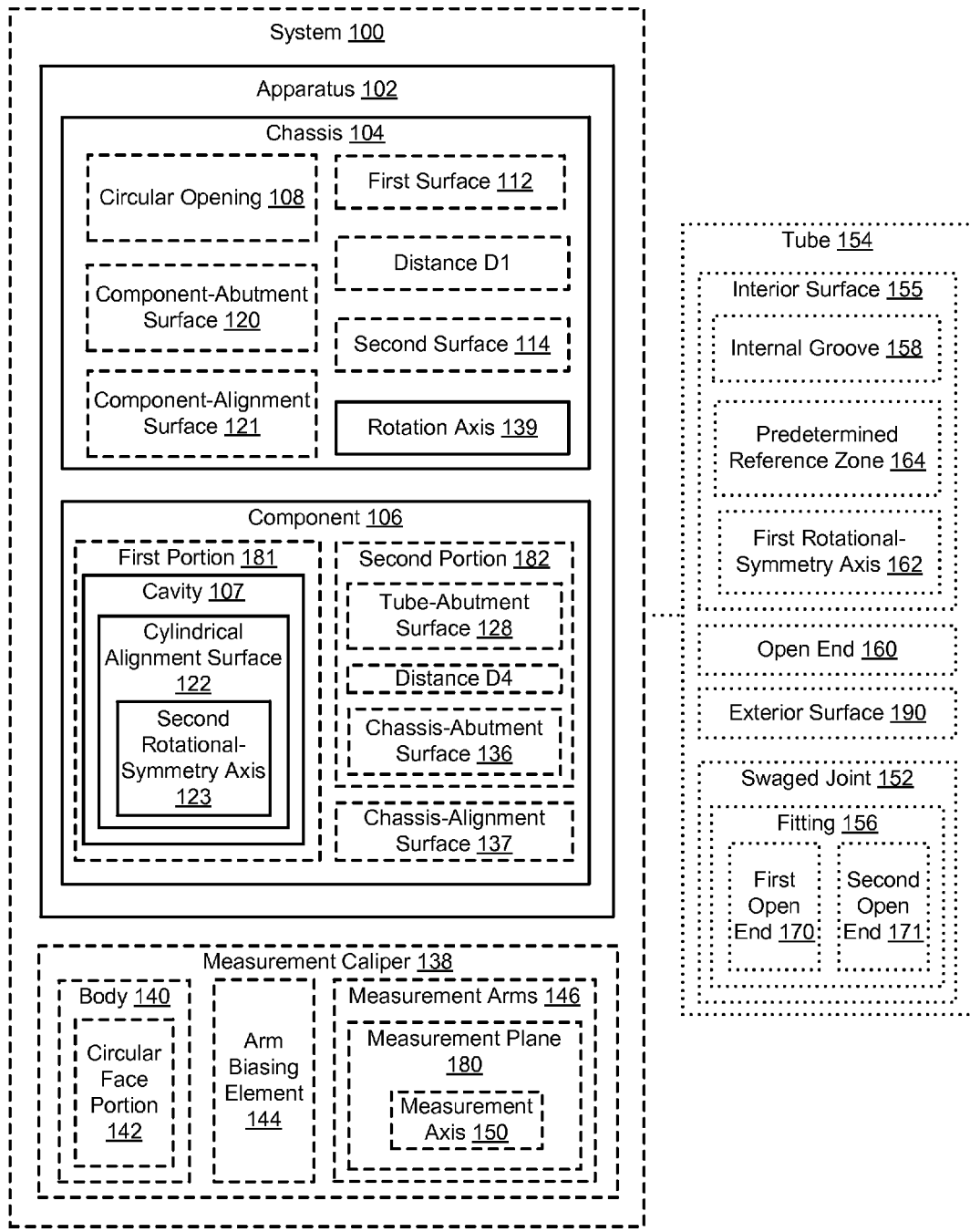
Figure 2A:
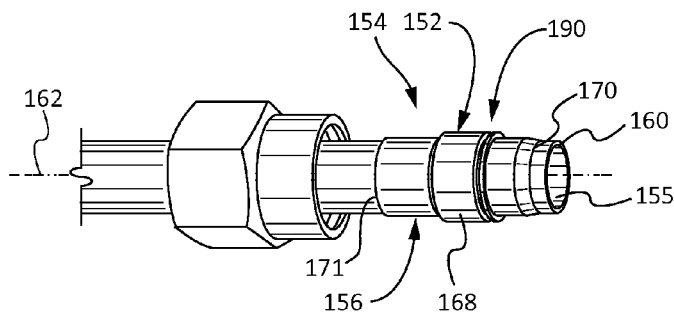
Figure 2B:
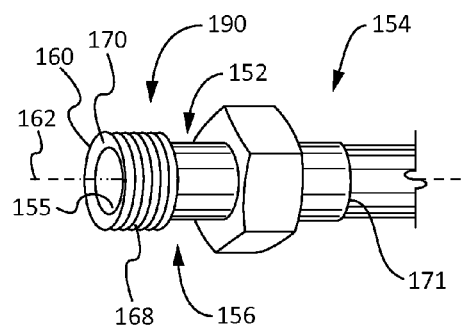
Figure 3:
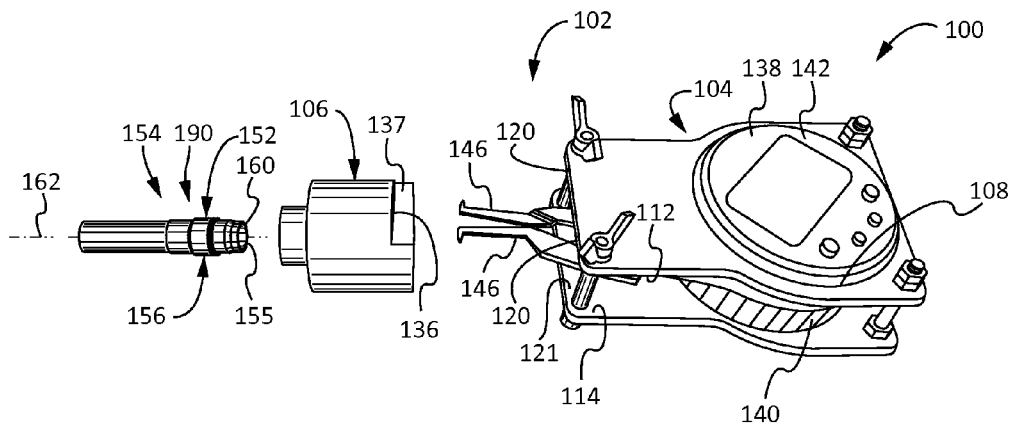
Figure 4:
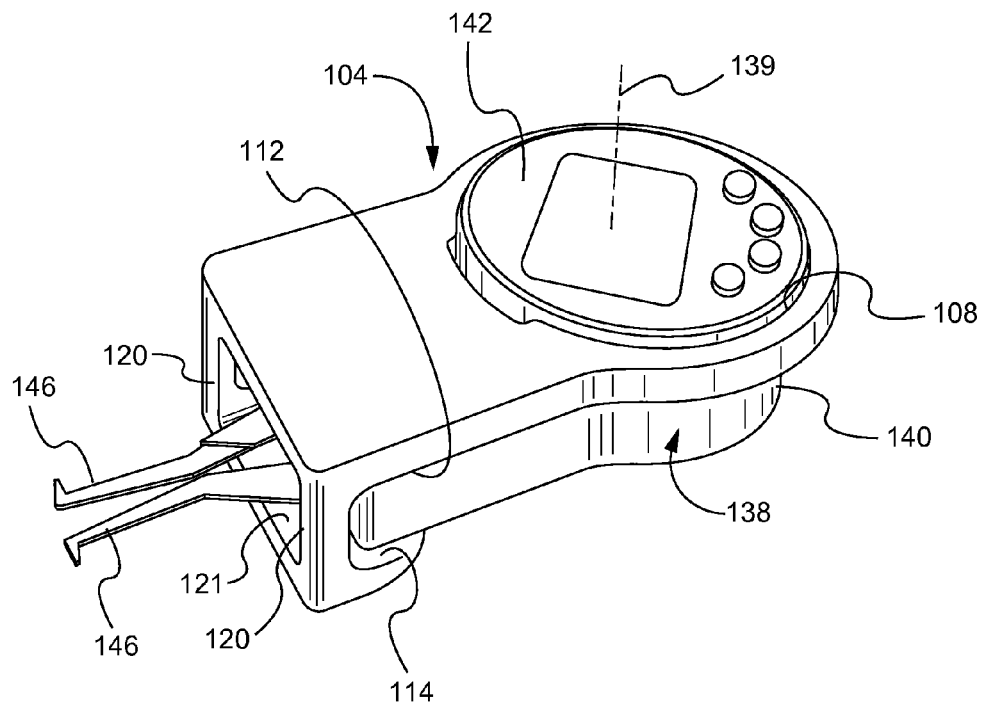
Figure 5:
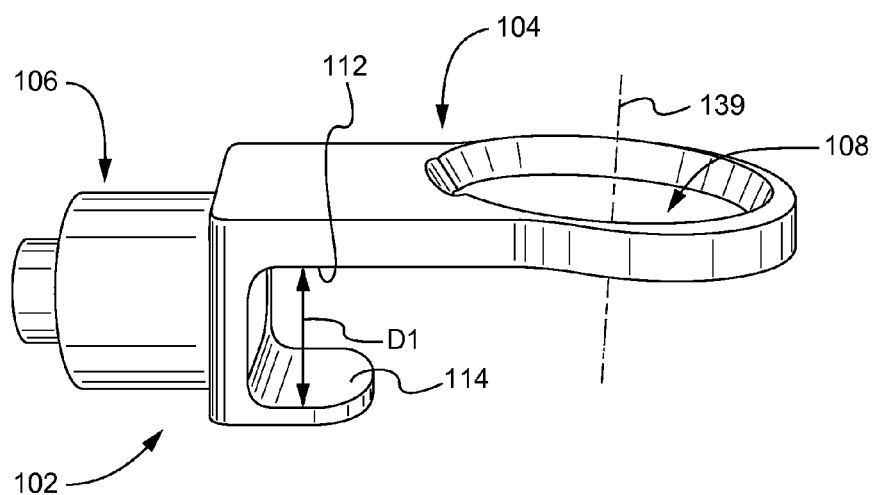
Figure 6:
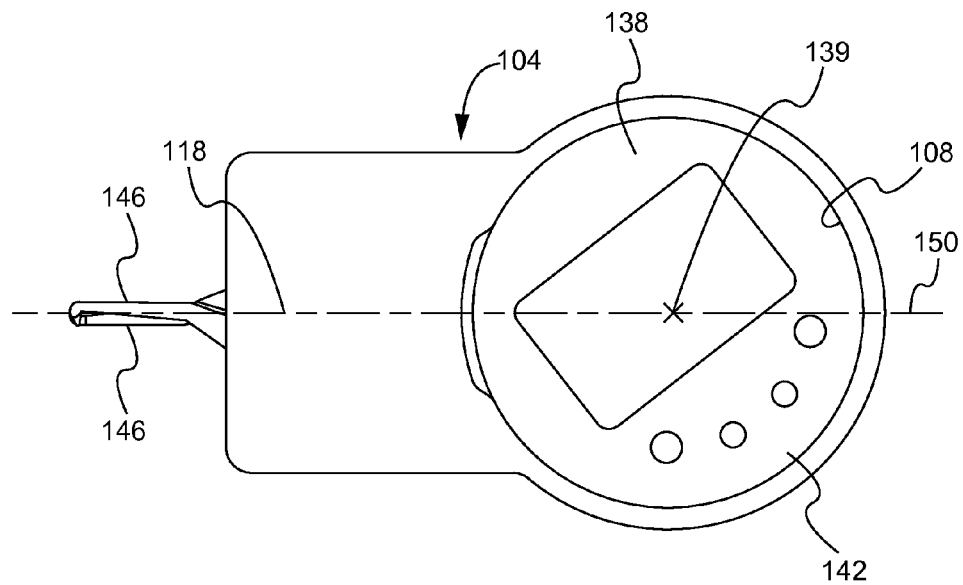
Figure 7:
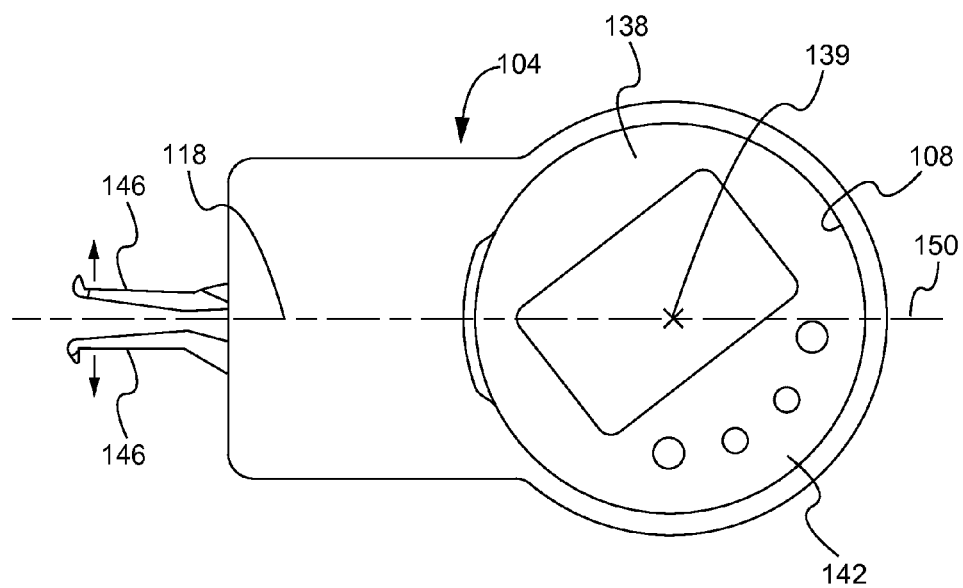
Figure 8:
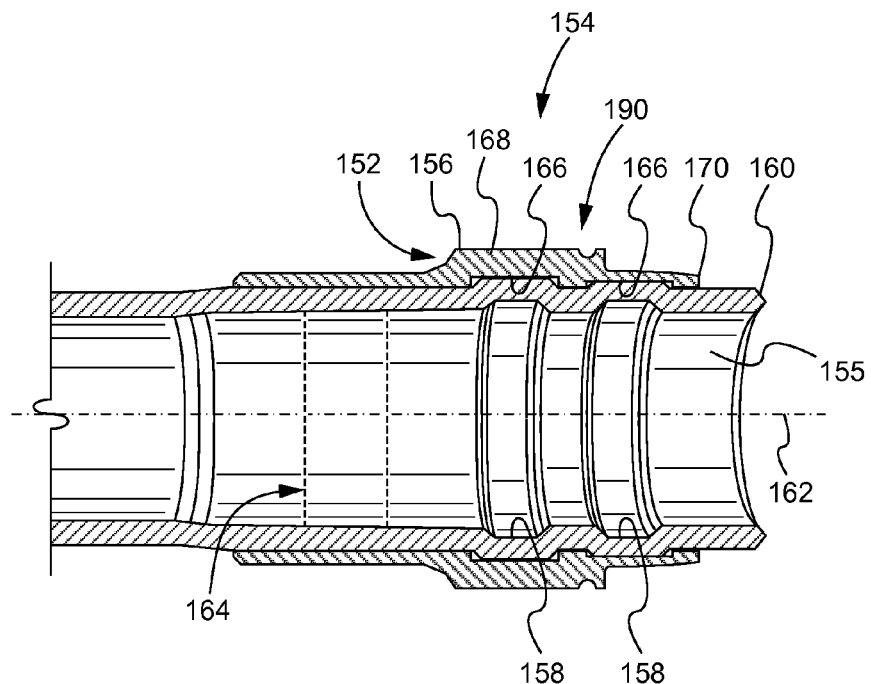
Figure 9:
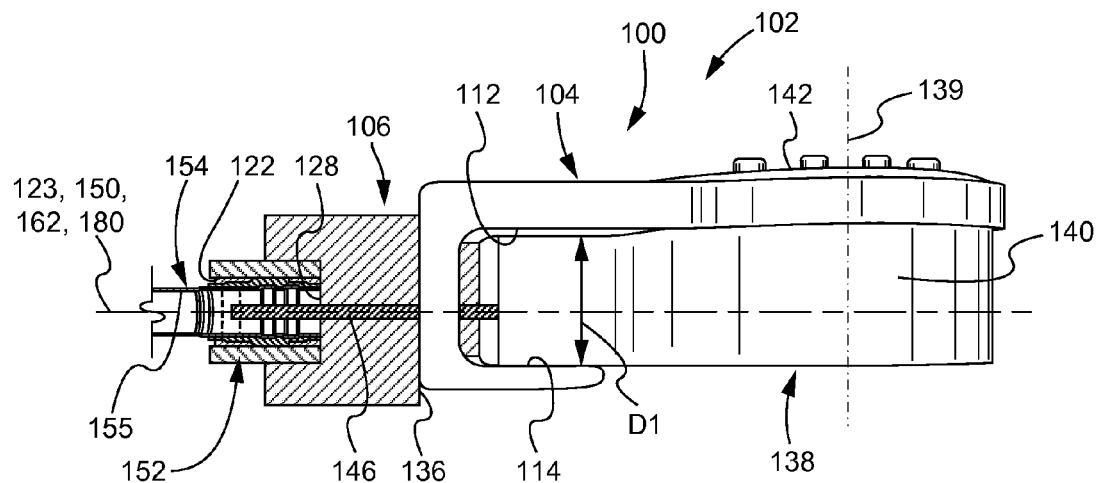
Figure 10:
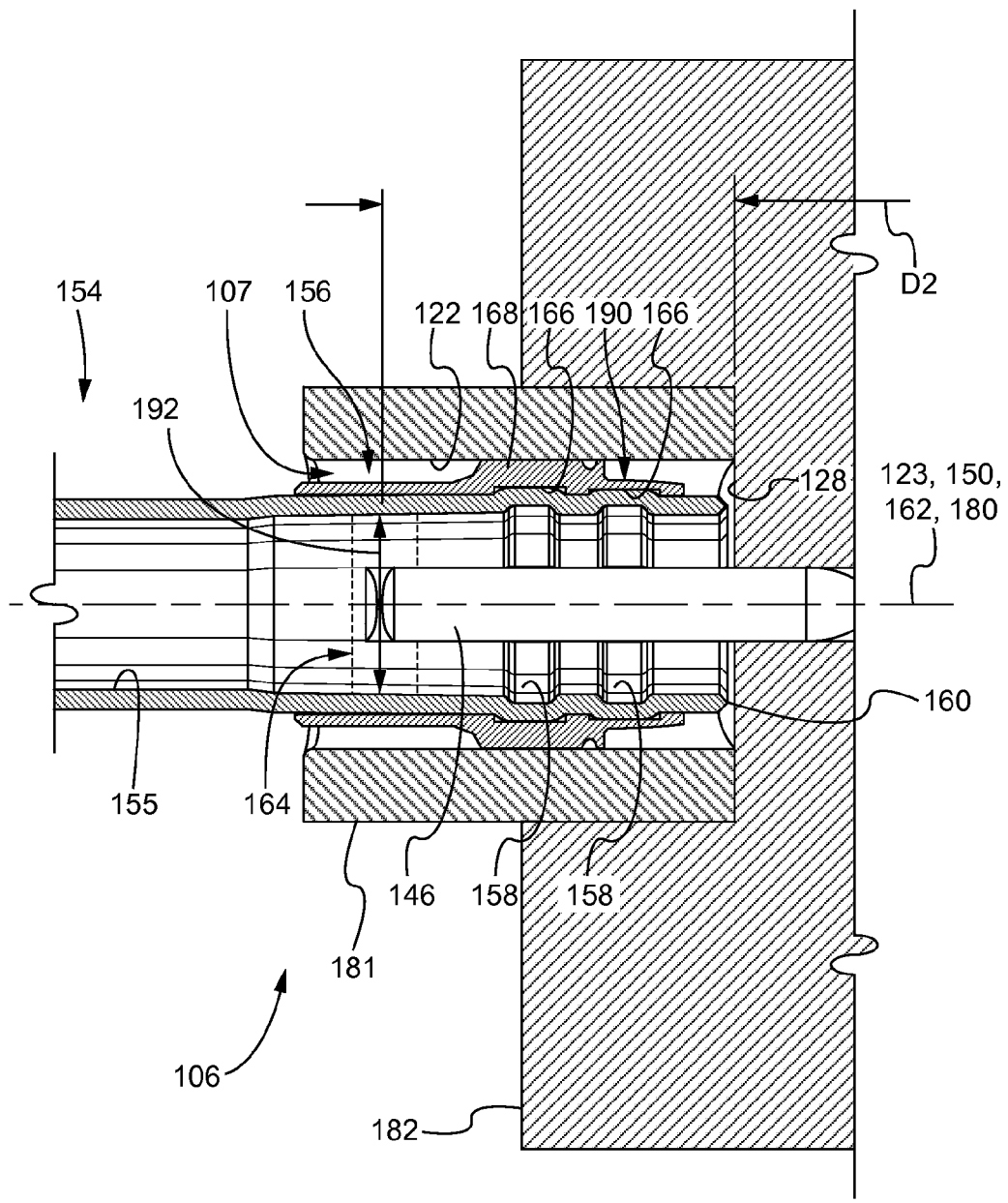
Figure 11:
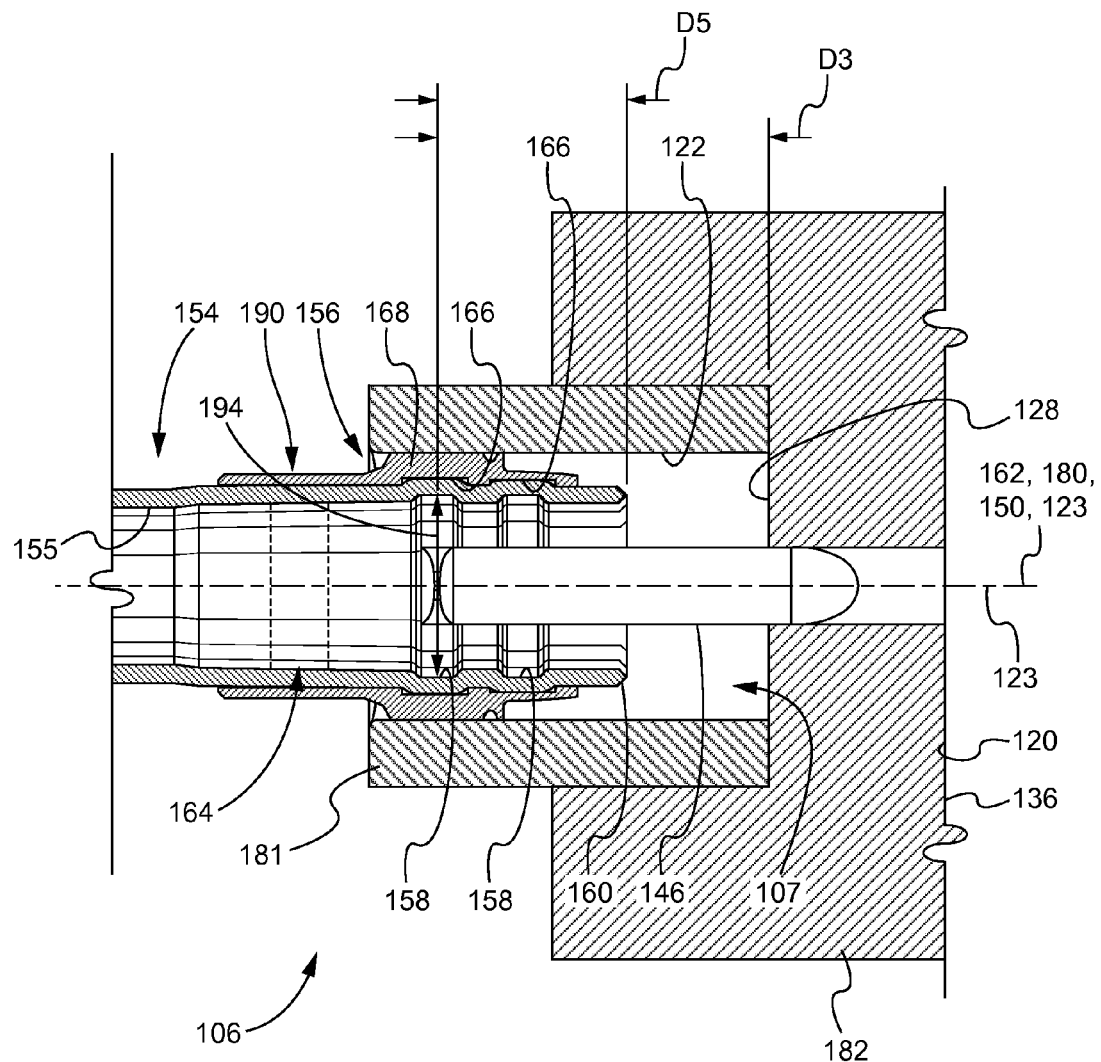
Figure 12:
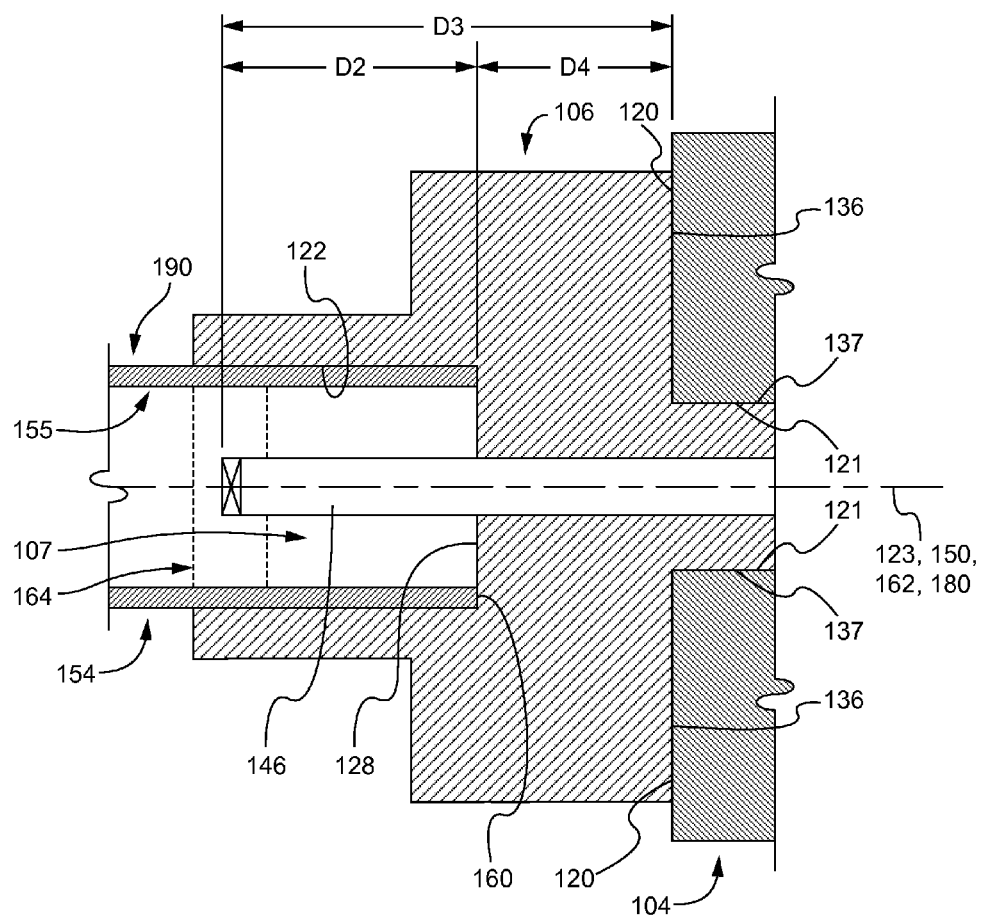
Figure 13A:
Figure 13B:
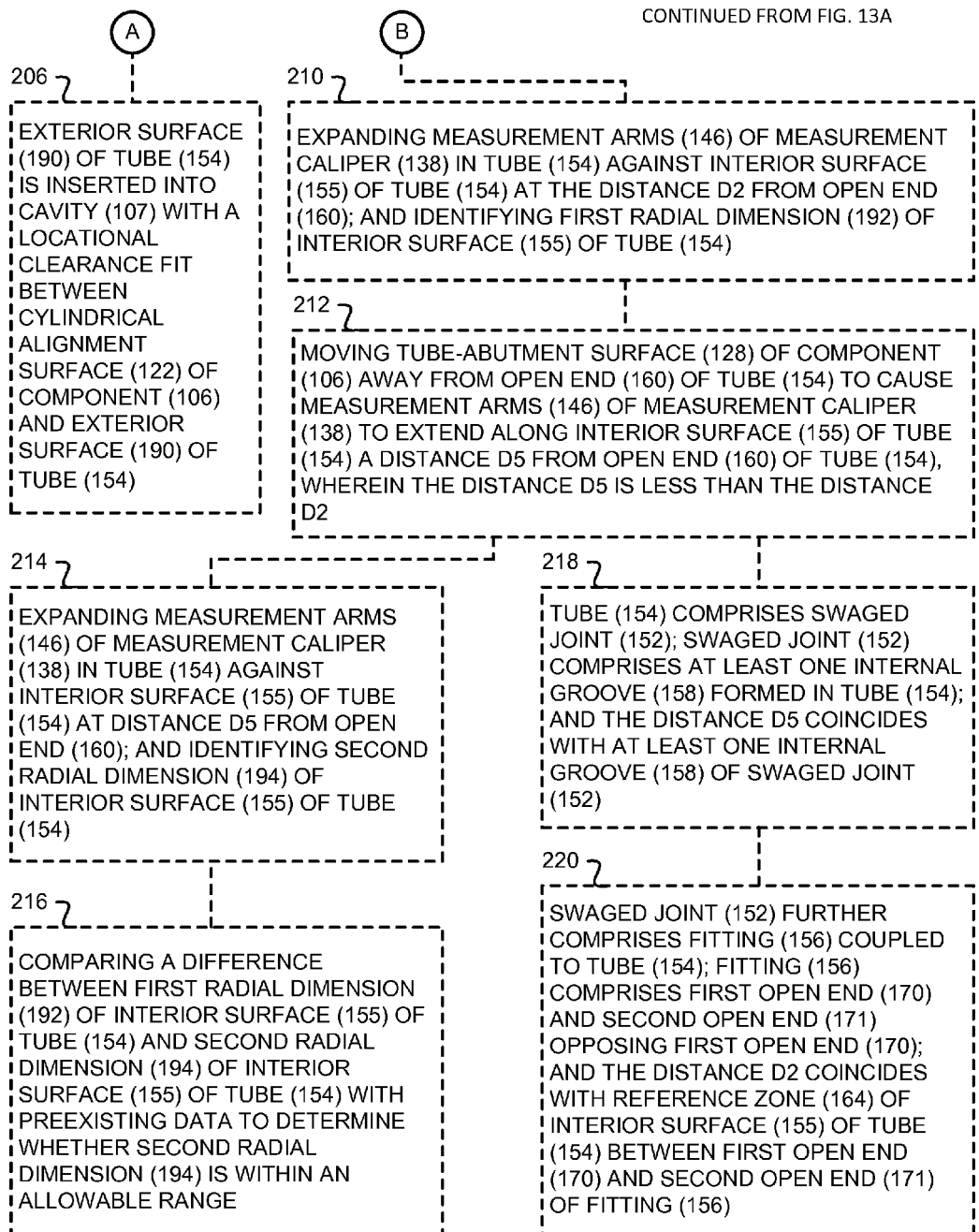
Figure 14:
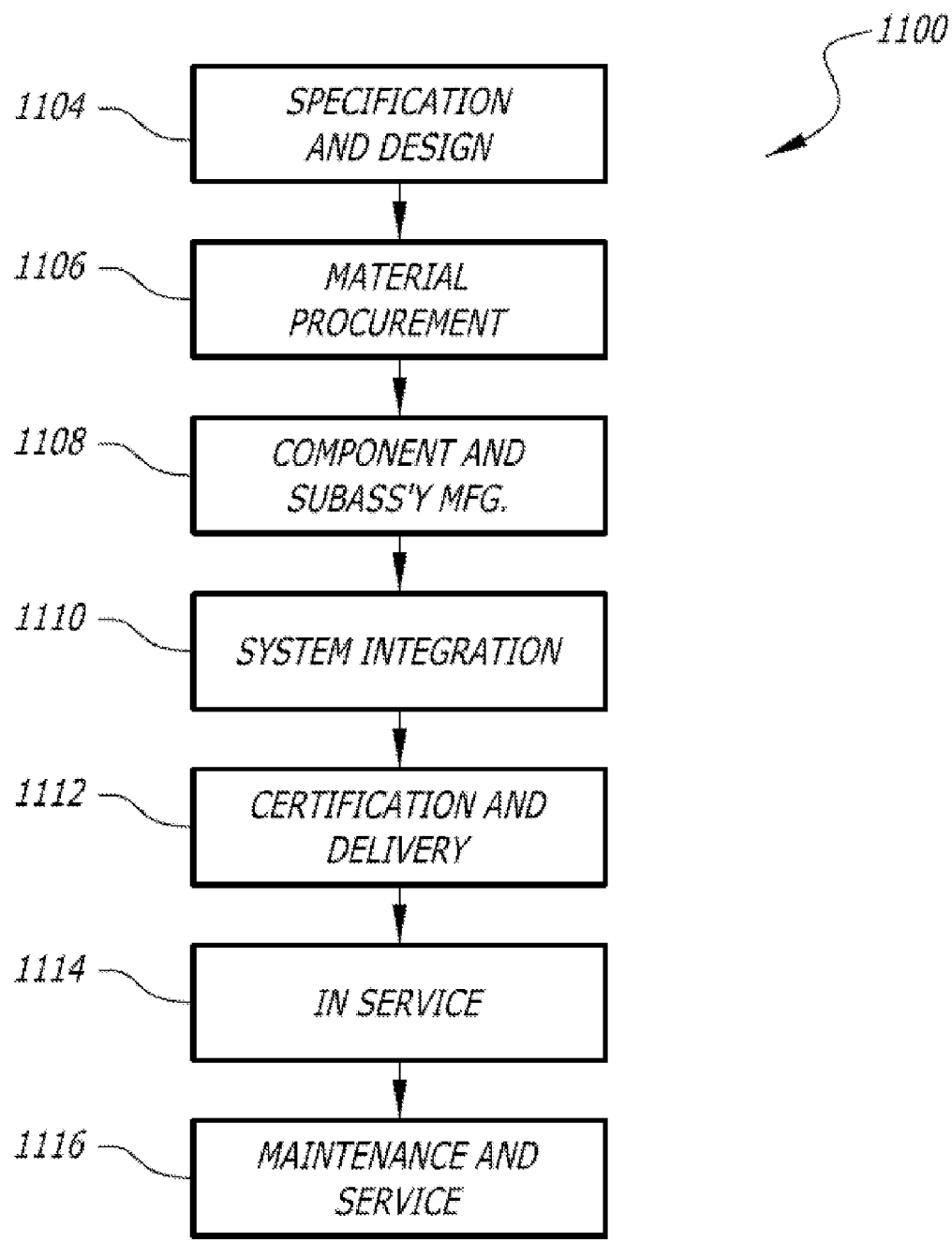
Figure 15:
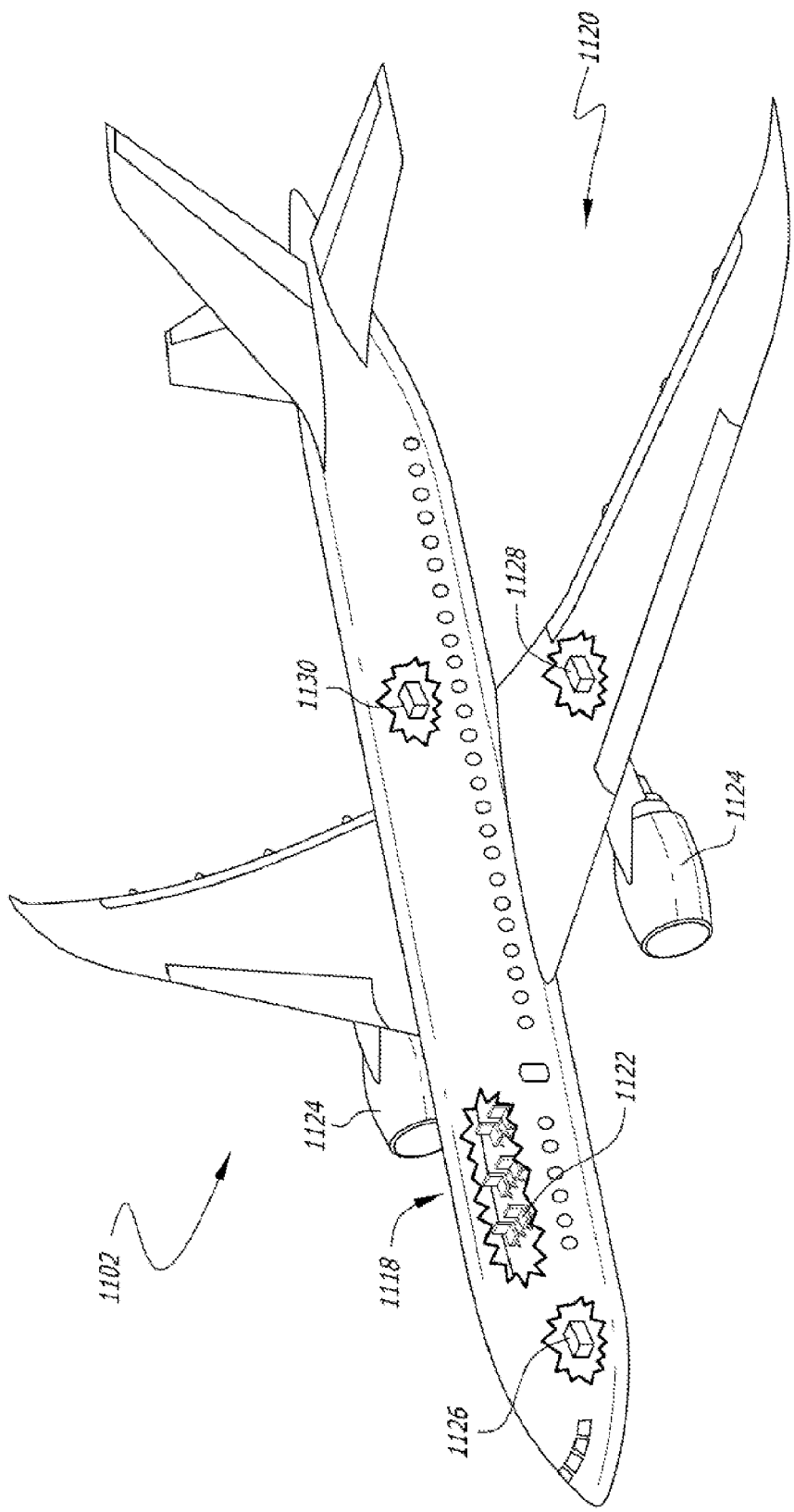

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a system for inspecting an interior surface of a tube, according to one or more examples of the present disclosure;

FIG. 2A is a schematic perspective view of a tube comprising a swaged joint, according to one or more examples of the present disclosure;

FIG. 2B is a schematic perspective view of a tube comprising a swaged joint, according to one or more examples of the present disclosure;

FIG. 3 is a schematic perspective exploded view of the system of FIG. 1, according to one or more examples of the present disclosure;

FIG. 4 is a schematic perspective view of a chassis and measurement caliper of the system of FIG. 1, according to one or more examples of the present disclosure;

FIG. 5 is a schematic perspective view of a chassis and component of the system of FIG. 1, according to one or more examples of the present disclosure;

FIG. 6 is a schematic top plan view of a chassis and measurement caliper of the system of FIG. 1, according to one or more examples of the present disclosure;

FIG. 7 is a schematic top plan view of a chassis and measurement caliper of the system of FIG. 1, according to one or more examples of the present disclosure;

FIG. 8 is a schematic section view of a tube comprising a swaged joint, according to one or more examples of the present disclosure;

FIG. 9 is a schematic, partial-section, side elevation view of the system of FIG. 1, according to one or more examples of the present disclosure;

FIG. 10 is a schematic, partial-section, side elevation view of a component and measurement-caliper arms of the system of FIG. 1, according to one or more examples of the present disclosure;

FIG. 11 is a schematic, partial-section, side elevation view of a component and measurement-caliper arms of the system of FIG. 1, according to one or more examples of the present disclosure;

FIG. 12 is a schematic, partial-section, side elevation view of a component and measurement-caliper arms of the system of FIG. 1, according to one or more examples of the present disclosure;

FIG. 13A is a first portion of a block diagram of a method of inspecting an interior surface of a tube, according to one or more examples of the present disclosure;

FIG. 13B is a second portion of the block diagram of the method of inspecting an interior surface of a tube, according to one or more examples of the present disclosure;

FIG. 14 is a block diagram of aircraft production and service methodology; and FIG. 15 is a schematic illustration of an aircraft.

DETAILED DESCRIPTION

In FIG. 1, referred to above, solid lines, if any, connecting various elements and/or components may represent mechanical, electrical, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 13A, 13B, and 14, referred to above, the blocks may represent operations and/or portions thereof and lines connecting the various blocks do not imply any particular order or dependency of the operations or portions thereof. Blocks represented by dashed lines indicate optional operations and/or portions thereof. Dashed lines, if any, connecting the various blocks represent optional dependencies of the operations or portions thereof. It will be understood that not all dependencies among the various disclosed operations are necessarily represented. FIGS. 13A, 13B, and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring e.g. to FIGS. 1, 3, 5, and 9, apparatus 102 for positioning measurement caliper 138 relative to exterior surface 190 of tube 154 for inspecting interior surface 155 of tube 154 is disclosed. Interior surface 155 of tube 154 has first rotational-symmetry axis 162. Measurement caliper 138 comprises measurement arms 146 defining measurement plane 180 and measurement axis 150 in measurement plane 180. Apparatus 102 comprises chassis 104 configured to be coupled to measurement caliper 138 so that chassis 104 is rotatable relative to measurement caliper 138 about rotation axis 139 perpendicular to measurement plane 180 and is configured to be fixed relative to measurement caliper 138 along rotation axis 139 and along measurement axis 150, defined by measurement arms 146 of measurement caliper 138. Apparatus 102 also comprises component 106 configured to extend from chassis 104. Component 106 comprises cylindrical alignment surface 122 defining cavity 107. Cylindrical alignment surface 122 has second rotational-symmetry axis 123. With chassis 104 coupled to measurement caliper 138 and component 106 extending from chassis 104, measurement arms 146 of measurement caliper 138 protrude at least partially through cavity 107 of component 106 and second rotational-symmetry axis 123 of cylindrical alignment surface 122 of component 106 is coplanar with measurement plane 180 defined by measurement arms 146 of measurement caliper 138. The preceding subject matter of the instant paragraph is in accordance with example 1 of the present disclosure.

Chassis 104 and component 106 of apparatus 102 cooperate to position measurement caliper 138 relative to tube 154 for improving the ease and accuracy of inspecting interior surface 155 of tube 154. More specifically, apparatus 102 facilitates proper alignment between measurement arms 146 of measurement caliper 138 and tube 154. Proper alignment between measurement arms 146 of measurement caliper 138 and tube 154 eliminates inaccurate measurements taken by measurement caliper 138.

Referring to FIGS. 4, 6, and 7, measurement arms 146 of measurement caliper 138 extend linearly in a lengthwise direction from body 140 of measurement caliper 138. Measurement arms 146 each terminate at a measurement point at a distal end of each measurement arm 146. The measurement points are biased via arm biasing element 144 of measurement caliper 138 (see e.g. FIG. 1) to expand away from each other to engage a surface to be measured. Measurement plane 180 is defined a single plane that passes through the measurement points of both measurement arms 146 and is parallel to measurement arms 146 along the length of measurement arms 146. Measurement axis 150 is defined as an axis that is coplanar with measurement plane 180 and is positioned midway between measurement arms 146 of measurement caliper 138.

Chassis 104 is configured to be fixed relative to measurement caliper 138 along rotation axis 139 and along measurement axis 150 due to a locational clearance fit between chassis 104 and measurement caliper 138. Generally, chassis 104 is fixed relative to measurement caliper 138 with the amount of play allowable by the locational clearance fit.

Referring generally to FIG. 1 and particularly to e.g. FIGS. 3-7 and 9, chassis 104 comprises first surface 112 and second surface 114 facing first surface 112. First surface 112 of chassis 104 and second surface 114 of chassis 104 are separated by distance D1. When chassis 104 is coupled to measurement caliper 138, measurement caliper 138 is retained between first surface 112 and second surface 114 of chassis 104 to fix chassis 104 relative to measurement caliper 138 along rotation axis 139. The preceding subject matter of the instant paragraph is in accordance with example 2 of the present disclosure, and example 2 includes the subject matter of example 1, above.

Fixing chassis 104 relative to measurement caliper 138 along rotation axis 139 using first surface 112 and second surface 114 ensures measurement caliper 138 is in a known position relative to rotation axis 139.

Referring generally to FIG. 1 and particularly to e.g. FIGS. 3, 4, and 9, measurement caliper 138 is retained between first surface 112 and second surface 114 of chassis 104 with locational clearance fit. The preceding subject matter of the instant paragraph is in accordance with example 3 of the present disclosure, and example 3 includes the subject matter of example 2, above.

The locational clearance fit between measurement caliper 138 and first surface 112 and second surface 114 of chassis 104 ensures measurement caliper 138 is in a known position relative to rotation axis 139 within a tolerance allowable by the locational clearance fit. In one example, the tolerance allowable by the locational clearance fit allows measurement caliper 138 to be removably retained between first surface 112 and second surface 114 of chassis 104.

Referring generally to FIG. 1 and particularly to e.g. FIG. 3, distance D1 between first surface 112 and second surface 114 of chassis 104 is adjustable. The preceding subject matter of the instant paragraph is in accordance with example 4 of the present disclosure, and example 4 includes the subject matter of any of examples 2 and 3, above.

Adjustability of distance D1 between first surface 112 and second surface 114 of chassis 104 facilitates retention of measurement caliper 138 between first surface 112 and second surface 114, and removal of measurement caliper 138 from between first surface 112 and second surface 114. In one example, adjustability of distance D1 between first surface 112 and second surface 114 of chassis 104 facilitates retention of measurement calipers 138 of different sizes. Adjustability of distance D1 is accomplished via fasteners and/or resiliently flexible materials in one example.

Referring generally to FIG. 1 and particularly to e.g. FIGS. 3-7, chassis 104 comprises circular opening 108. When chassis 104 is coupled to measurement caliper 138, circular face portion 142 of body 140 of measurement caliper 138 is received by circular opening 108 of chassis 104 to fix chassis 104 relative to measurement caliper 138 along measurement axis 150, defined by measurement arms 146 coupled to body 140 of measurement caliper 138. The preceding subject matter of the instant paragraph is in accordance with example 5 of the present disclosure, and example 5 includes the subject matter of any of examples 1-4, above.

Fixing chassis 104 relative to measurement caliper 138 along measurement axis 150 by receiving circular face portion 142 of body 140 of measurement caliper 138 within circular opening 108 of chassis 104 ensures measurement caliper 138 is in a known position relative to measurement axis 150.

Referring generally to FIG. 1 and particularly to e.g. FIGS. 3-7, circular face portion 142 of body 140 of measurement caliper 138 is received by circular opening 108 with a locational clearance fit. The preceding subject matter of the instant paragraph is in accordance with example 6 of the present disclosure, and example 6 includes the subject matter of example 5, above.

The locational clearance fit between circular face portion 142 of body 140 of measurement caliper 138 and circular opening 108 ensures measurement caliper 138 is in a known position relative to measurement axis 150 within a tolerance allowable by the locational clearance fit. In one example, the tolerance allowable by the locational clearance fit allows circular face portion 142 of body 140 of measurement caliper 138 to be removably received by circular opening 108.

Referring generally to FIG. 1 and particularly to e.g. FIGS. 3 and 9, component 106 is configured to be removably coupled to chassis 104. The preceding subject matter of the instant paragraph is in accordance with example 7 of the present disclosure, and example 7 includes the subject matter of any of examples 1-6, above.

Removably coupling component 106 to chassis 104 enables coupling of differently sized components 106 associated with tubes 154 having differently sized interior surfaces 155 to one chassis 104. For example, one component 106 configured to inspect one tube 154 with interior surface 155 of one size can be replaced or interchanged with another component 106 configured to inspect another tube 154 with interior surface 155 of another size.

Referring generally to FIG. 1 and particularly to e.g. FIGS. 3, 4, and 12, chassis 104 comprises component-alignment surface 121. Component 106 comprises chassis-alignment surface 137. When chassis 104 is coupled to measurement caliper 138 and chassis-alignment surface 137 of component 106 is mated with component-alignment surface 121 of chassis 104, second rotational-symmetry axis 123 of cylindrical alignment surface 122 of component 106 is coplanar with measurement plane 180 defined by measurement arms 146 of measurement caliper 138. The preceding subject matter of the instant paragraph is in accordance with example 8 of the present disclosure, and example 8 includes the subject matter of example 7, above.

Mating chassis-alignment surface 137 of component 106 with component-alignment surface 121 of chassis 104 ensures component 106 is in a known position relative to chassis 104 and measurement caliper 138.

Referring generally to FIG. 1 and particularly to e.g. FIGS. 3 and 12, component-alignment surface 121 and chassis-alignment surface 137 are complementary surfaces. The preceding subject matter of the instant paragraph is in accordance with example 9 of the present disclosure, and example 9 includes the subject matter of example 8, above.

The complementary surfaces of component-alignment surface 121 and chassis-alignment surface 137 facilitate a secure and predictable fit between component-alignment surface 121 and chassis-alignment surface 137, thereby ensuring component 106 is in a known position relative to chassis 104 and measurement caliper 138.

Referring generally to FIG. 1 and particularly to e.g. FIG. 12, when chassis 104 is coupled to measurement caliper 138, at least one line coplanar with component-alignment surface 121 of chassis 104 is parallel to measurement plane 180 defined by measurement arms 146 of measurement caliper 138. Chassis-alignment surface 137 of component 106 is parallel to second rotational-symmetry axis 123 of cylindrical alignment surface 122 of component 106. The preceding subject matter of the instant paragraph is in accordance with example 10 of the present disclosure, and example 10 includes the subject matter of any of examples 8 and 9, above.

With chassis-alignment surface 137 mated with component-alignment surface 121, chassis-alignment surface 137 parallel to second rotational-symmetry axis 123, and at least one line coplanar with component-alignment surface 121 parallel to measurement plane 180, second rotational-symmetry axis 123 is ensured to be parallel to measurement plane 180, which facilitates proper alignment between measurement arms 146 of measurement caliper 138 and tube 154.

Referring generally to FIG. 1 and particularly to e.g. FIGS. 9-12, component 106 further comprises tube-abutment surface 128 in cavity 107. Tube-abutment surface 128 is configured to abut open end 160 of tube 154. Component 106 also comprises chassis-abutment surface 136 configured to abut component-abutment surface 120 of chassis 104. Tube-abutment surface 128 is spaced distance D4 from chassis-abutment surface 136. The preceding subject matter of the instant paragraph is in accordance with example 11 of the present disclosure, and example 11 includes the subject matter of any of examples 8-10, above.

Abutment between component-abutment surface 120 and chassis-abutment surface 136, and abutment between tube-abutment surface 128 and open end 160 of tube 154, ensures measurement arms 146 of measurement caliper 138 protrude a known distance into tube 154.

Referring generally to FIG. 1 and particularly to e.g. FIG. 12, when chassis 104 is coupled to measurement caliper 138, tube-abutment surface 128 of component 106 abuts open end 160 of tube 154, cylindrical alignment surface 122 of component 106 is engaged with exterior surface 190 of tube 154, and chassis-abutment surface 136 of component 106 abuts component-abutment surface 120 of chassis 104, measurement arms 146 of measurement caliper 138 protrude distance D2 into tube 154 equal to distance D3 measurement arms 146 of measurement caliper 138 extend past component-abutment surface 120 of chassis 104 minus distance D4. The preceding subject matter of the instant paragraph is in accordance with example 12 of the present disclosure, and example 12 includes the subject matter of example 11, above.

By configuring apparatus 102 to have distance D3 and distance D4, the exact distance measurement arms 146 of measurement caliper 138 will protrude into tube 154 is known.

Referring generally to FIG. 1 and particularly to e.g. FIGS. 10 and 11, component 106 comprises first portion 181 and second portion 182 configured to be coupled to first portion 181. First portion 181 of component 106 comprises cylindrical alignment surface 122 and second portion 182 of component 106 comprises tube-abutment surface 128. The preceding subject matter of the instant paragraph is in accordance with example 13 of the present disclosure, and example 13 includes the subject matter of any of examples 11 and 12, above.

Coupling first portion 181 and second portion 182 to form component 106 facilitates making first portion 181 and second portion 182 of different materials. For example, first portion 181 can be made from a harder material, such as metal, and second portion 182 can be made from a softer material, such as plastic.

Referring generally to FIG. 1 and particularly to e.g. FIGS. 10 and 11, first portion 181 of component 106 can be configured to be removably or fixedly coupled to second portion 182 of component 106. The preceding subject matter of the instant paragraph is in accordance with example 14 of the present disclosure, and example 14 includes the subject matter of example 13, above.

Removably coupling first portion 181 to second portion 182 enables coupling of differently sized first portions 181 associated with tubes 154 having differently sized interior surfaces 155 to one second portion 182. For example, one first portion 181 configured to inspect one tube 154 with interior surface 155 of one size can be replaced or interchanged with another first portion 181 configured to inspect another tube 154 with interior surface 155 of another size.

Referring generally to FIG. 1 and particularly to e.g. FIGS. 9, 10, 11, and 12, cylindrical alignment surface 122 of component 106 is configured to engage exterior surface 190 of tube 154 with a locational clearance fit. The preceding subject matter of the instant paragraph is in accordance with example 15 of the present disclosure, and example 15 includes the subject matter of any of examples 1-14, above.

The locational clearance fit between cylindrical alignment surface 122 and exterior surface 190 of tube 154 ensures component 106 is in a known position relative to tube 154 within a tolerance allowable by the locational clearance fit.

Referring generally to FIG. 1 and particularly to e.g. FIGS. 9-12, when chassis 104 is coupled to measurement caliper 138, component 106 extends from chassis 104, and cylindrical alignment surface 122 of component 106 is engaged with exterior surface 190 of tube 154, first rotational-symmetry axis 162 of interior surface 155 of tube 154 is coplanar with measurement plane 180 defined by measurement arms 146 of measurement caliper 138. The preceding subject matter of the instant paragraph is in accordance with example 16 of the present disclosure, and example 16 includes the subject matter of example 15, above.

Engagement between cylindrical alignment surface 122 of component 106 and exterior surface 190 of tube 154 facilitates proper alignment between measurement arms 146 of measurement caliper 138 and interior surface 155 of tube 154.

Referring generally to FIG. 1 and particularly to e.g. FIGS. 9, 10, and 12, component 106 comprises tube-abutment surface 128 in cavity 107. Tube-abutment surface 128 of component 106 is configured to abut open end 160 of tube 154. The preceding subject matter of the instant paragraph is in accordance with example 17 of the present disclosure, and example 17 includes the subject matter of any of examples 15 and 16, above.

Abutment between tube-abutment surface 128 and open end 160 of tube 154 ensures tube 154 is in a known position relative to component 106.

Referring generally to FIG. 1 and particularly to e.g. FIGS. 10 and 12, when chassis 104 is coupled to measurement caliper 138, component 106 extends from chassis 104, cylindrical alignment surface 122 of component 106 is engaged with exterior surface 190 of tube 154, and tube-abutment surface 128 of component 106 abuts open end 160 of tube 154, measurement arms 146 of measurement caliper 138 extend along interior surface 155 of tube 154 distance D2 from open end 160 of tube 154. The preceding subject matter of the instant paragraph is in accordance with example 18 of the present disclosure, and example 18 includes the subject matter of example 17, above.

Abutment between tube-abutment surface 128 and open end 160 of tube 154 ensures measurement arms 146 of measurement caliper 138 will extend along interior surface 155 of tube 154 a known distance.

Referring e.g. to FIGS. 1, 3, and 9-12, system 100 for inspecting interior surface 155 of tube 154 is disclosed. Interior surface 155 has first rotational-symmetry axis 162. System 100 comprises measurement caliper 138, in turn comprising body 140 and measurement arms 146 coupled to body 140 and defining measurement plane 180 and measurement axis 150 in measurement plane 180. Body 140 comprises circular face portion 142. System 100 further comprises chassis 104 coupled to measurement caliper 138 so that chassis 104 is rotatable relative to measurement caliper 138 about rotation axis 139 perpendicular to measurement plane 180 and is fixed relative to measurement caliper 138 along rotation axis 139 and along measurement axis 150, defined by measurement arms 146 coupled to body 140 of measurement caliper 138. Additionally, system 100 comprises component 106 extending from chassis 104. Component 106 comprises cylindrical alignment surface 122 defining cavity 107. Cylindrical alignment surface 122 has second rotational-symmetry axis 123. Measurement arms 146 of measurement caliper 138 protrude at least partially through cavity 107 of component 106 and second rotational-symmetry axis 123 of cylindrical alignment surface 122 is coplanar with measurement plane 180 defined by measurement arms 146 of measurement caliper 138. The preceding subject matter of the instant paragraph is in accordance with example 19 of the present disclosure.

Engagement between system 100 and exterior surface 190 of tube 154 accurately positions measurement arms 146 of measurement caliper 138 a predictable distance within tube 154 for improving the ease and accuracy of inspecting interior surface 155 of tube at a desired location within tube 154.

Referring generally to e.g. FIGS. 1, 3, and 9-12, and particularly to FIG. 13A (block 202), method 200 of inspecting interior surface 155 of tube 154 is disclosed. Interior surface 155 has first rotational-symmetry axis 162. Method 200 comprises providing chassis 104 coupled to measurement caliper 138 so that chassis 104 is rotatable relative to measurement caliper 138 about rotation axis 139 perpendicular to measurement plane 180 defined by measurement arms 146 of measurement caliper 138 and is fixed relative to measurement caliper 138 along rotation axis 139 and along measurement axis 150, defined by measurement arms 146 of measurement caliper 138. Measurement axis 150 is in measurement plane 180. Method 200 further comprises providing component 106 extending from chassis 104. Component 106 comprises cylindrical alignment surface 122 defining cavity 107. Cylindrical alignment surface 122 has second rotational-symmetry axis 123. Measurement arms 146 of measurement caliper 138 protrude at least partially through cavity 107 of component 106 and second rotational-symmetry axis 123 of cylindrical alignment surface 122 is coplanar with measurement plane 180 defined by measurement arms 146 of measurement caliper 138. Additionally, method 200 comprises inserting measurement arms 146 of measurement caliper 138 into tube 154. Method 200 also comprises causing first rotational-symmetry axis 162 of interior surface 155 of tube 154 and measurement plane 180 defined by measurement arms 146 of measurement caliper 138 to be coplanar by aligning second rotational-symmetry axis 123 of cylindrical alignment surface 122 of component 106 with first rotational-symmetry axis 162 of interior surface 155 of tube 154. The preceding subject matter of the instant paragraph is in accordance with example 20 of the present disclosure.

Interior surface 155 of tube 154 is thereby inspected without misalignment between measurement arms 146 of measurement caliper 138 and first rotational-symmetry axis 162 of interior surface 155. Difficulty of aligning measurement arms 146 with tube 154 for inspection of interior surface 155 of tube 154 is thus decreased.

Continuing to refer generally to e.g. FIGS. 1, 3, and 9-12, and particularly to e.g. FIG. 13A (block 204), method 200 further comprises aligning second rotational-symmetry axis 123 of cylindrical alignment surface 122 of component 106 with first rotational-symmetry axis 162 of interior surface 155 of tube 154 by inserting exterior surface 190 of tube 154 into cavity 107 of component 106. The preceding subject matter of the instant paragraph is in accordance with example 21 of the present disclosure, and example 21 includes the subject matter of example 20, above.

Using cavity 107 of component 106 to receive exterior surface 190 of tube 154 for alignment between second rotational-symmetry axis 123 and first rotational-symmetry axis 162 eliminates uncertainty regarding whether measurement arms 146 of measurement caliper 138 are aligned with tube 154 for inspection of interior surface 155.

Continuing to refer generally to e.g. FIGS. 1, 3, and 9-12, and particularly to e.g. FIG. 13B (block 206), exterior surface 190 of tube 154 is inserted into cavity 107 with locational clearance fit between cylindrical alignment surface 122 of component 106 and exterior surface 190 of tube 154. The preceding subject matter of the instant paragraph is in accordance with example 22 of the present disclosure, and example 22 includes the subject matter of example 21, above.

The locational clearance fit between cylindrical alignment surface 122 and exterior surface 190 of tube 154 ensures measurement arms 146 of measurement caliper 138 are aligned with tube 154 within a tolerance allowable by the locational clearance fit.

Continuing to refer generally to e.g. FIGS. 1, 3, and 9-12, and particularly to e.g. FIG. 13A (block 208), method 200 further comprises causing measurement arms 146 of measurement caliper 138 to extend along interior surface 155 of tube 154 distance D2 from open end 160 of tube 154 when tube-abutment surface 128 of component 106 is abutted against open end 160 of tube 154. The preceding subject matter of the instant paragraph is in accordance with example 23 of the present disclosure, and example 23 includes the subject matter of any of examples 20-22, above.

Abutment between tube-abutment surface 128 and open end 160 of tube 154 ensures measurement arms 146 of measurement caliper 138 will extend along interior surface 155 of tube 154 a known distance. Difficulty of positioning measurement arms 146 a predictable distance within tube 154 for inspection of interior surface 155 of tube 154 is thus decreased Continuing to refer generally to e.g. FIGS. 1, 3, and 9-12, and particularly to e.g. FIG. 13B (block 210), method 200 further comprises expanding measurement arms 146 of measurement caliper 138 in tube 154 against interior surface 155 of tube 154 at distance D2 from open end 160 and identifying first radial dimension 192 of interior surface 155 of tube 154. The preceding subject matter of the instant paragraph is in accordance with example 24 of the present disclosure, and example 24 includes the subject matter of example 23, above.

Expansion of measurement arms 146 against interior surface 155 of tube 154 at distance D2 ensures measurement axis 150 coaxially aligns with first rotational-symmetry axis 162 of interior surface 155 of tube 154 at distance D2. In an example, arm biasing element 144 of measurement caliper 138 facilitates the expansion of measurement arms 146. With coaxial alignment between measurement axis 150 and first rotational-symmetry axis 162, accurate identification of first radial dimension 192 is enabled.

Continuing to refer generally to e.g. FIGS. 1, 3, and 9-12, and particularly to e.g. FIG. 13B (block 212), method 200 further comprises moving tube-abutment surface 128 of component 106 away from open end 160 of tube 154 to cause measurement arms 146 of measurement caliper 138 to extend along interior surface 155 of tube 154 distance D5 from open end 160 of tube 154. Distance D5 is less than distance D2. The preceding subject matter of the instant paragraph is in accordance with example 25 of the present disclosure, and example 25 includes the subject matter of example 24, above.

Moving tube-abutment surface 128 away from open end 160 of tube 154 allows inspection of interior surface 155 of tube 154 at multiple locations from open end 160 of tube 154.

Continuing to refer generally to e.g. FIGS. 1, 3, and 9-12, and particularly to e.g. FIG. 13B (block 214), method 200 further comprises expanding measurement arms 146 of measurement caliper 138 in tube 154 against interior surface 155 of tube 154 at distance D5 from open end 160 of tube 154 and identifying second radial dimension 194 of interior surface 155 of tube 154. The preceding subject matter of the instant paragraph is in accordance with example 26 of the present disclosure, and example 26 includes the subject matter of example 25, above.

Expansion of measurement arms 146 against interior surface 155 of tube 154 at distance D5 ensures measurement axis 150 coaxially aligns with first rotational-symmetry axis 162 of interior surface 155 of tube 154 at distance D5. With coaxial alignment between measurement axis 150 and first rotational-symmetry axis 162, accurate identification of second radial dimension 194 is enabled.

Continuing to refer generally to e.g. FIGS. 1, 3, and 9-12, and particularly to e.g. FIG. 13B (block 216), method 200 further comprises comparing a difference between first radial dimension 192 of interior surface 155 of tube 154 and second radial dimension 194 of interior surface 155 of tube 154 with preexisting data to determine whether second radial dimension 194 is within an allowable range. The preceding subject matter of the instant paragraph is in accordance with example 27 of the present disclosure, and example 27 includes the subject matter of example 26, above.

Comparing difference between first radial dimension 192 and second radial dimension 194 with preexisting data to determine whether second radial dimension 194 is within an allowable range provides an indication of whether interior surface 155 of tube 154 is properly formed or sized. For example, second radial dimension 194 being within the allowable range indicates interior surface 155 of tube 154 is properly formed or sized, while second radial dimension 194 being outside of the allowable range indicates interior surface 155 of tube 154 is improperly formed or sized.

Continuing to refer generally to e.g. FIGS. 1, 2A, 2B, 3, and 9-12, and particularly to e.g. FIG. 13B (block 218), tube 154 comprises swaged joint 152, in turn comprising at least one internal groove 158 formed in tube 154. Distance D5 coincides with at least one internal groove 158 of swaged joint 152. The preceding subject matter of the instant paragraph is in accordance with example 28 of the present disclosure, and example 28 includes the subject matter of any of examples 25-27, above.

When tube 154 comprises swaged joint 152 with at least one internal groove 158 coinciding with distance D5, comparing difference between first radial dimension 192 and second radial dimension 194 with preexisting data to determine whether second radial dimension 194 is within an allowable range provides an indication of whether swaged joint 152 is properly formed or acceptable. For example, second radial dimension 194 being within the allowable range indicates swaged joint 152 is properly formed or acceptable, while second radial dimension 194 being outside of the allowable range indicates swaged joint 152 is improperly formed or inacceptable.

Continuing to refer generally to e.g. FIGS. 1, 2A, 2B, 3, and 9-12, and particularly to e.g. FIG. 13B (block 220), swaged joint 152 further comprises fitting 156 coupled to tube 154. Fitting 156 comprises first open end 170 and second open end 171 opposing first open end 170. Distance D2 coincides with reference zone 164 of interior surface 155 of tube 154 between first open end 170 and second open end 171 of fitting 156. The preceding subject matter of the instant paragraph is in accordance with example 29 of the present disclosure, and example 29 includes the subject matter of example 28, above.

Reference zone 164 of interior surface 155 of tube 154 is a featureless region inside tube 154 located further away from open end 160 of tube 154 than at least one internal groove 158 of swaged joint 152. Reference zone 164 may coincide with a tapered portion of interior surface 155 of tube 154. Additionally, reference zone 164 acts as a reference surface for identifying first radial dimension 192 as a reference radial dimension to compare against second radial dimension 194. Abutment between tube-abutment surface 128 and open end 160 of tube 154 ensures measurement arms 146 of measurement caliper 138 will extend along interior surface 155 of tube 154 to within reference zone 164 such that first radial dimension 192 is consistently identified within reference zone 164. As defined herein, exterior surface 190 of tube 154 can be an exterior surface of a non-swaged portion of tube 154 or an exterior surface of fitting 156 of swaged joint 152.

Continuing to refer generally to e.g. FIGS. 1, 3, and 9-12, and particularly to e.g. FIG. 13A (block 222), method 200 further comprises causing measurement axis 150, defined by measurement arms 146 of measurement caliper 138, to coaxially align with first rotational-symmetry axis 162 of interior surface 155 of tube 154 by allowing measurement caliper 138 to rotate relative to chassis 104 when second rotational-symmetry axis 123 of cylindrical alignment surface 122 of component 106 is aligned with first rotational-symmetry axis 162 of interior surface 155 of tube 154 and measurement arms 146 of measurement caliper 138 are expanded in tube 154 against interior surface 155 of tube 154. The preceding subject matter of the instant paragraph is in accordance with example 30 of the present disclosure, and example 30 includes the subject matter of any of examples 20-29, above.

Allowing measurement caliper 138 to rotate relative to chassis 104, when second rotational-symmetry axis 123 is aligned with first rotational-symmetry axis 162, facilitates self-centering or self-alignment of measurement axis 150 with first rotational-symmetry axis 162, and eliminates inaccurate measurements of radial dimensions of interior surface 155 of tube 154.

Examples of the present disclosure may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. An apparatus (102) for positioning a measurement caliper (138) relative to an exterior surface (190) of a tube (154) for inspecting an interior surface (155) of the tube (154), the interior surface (155) of the tube (154) having a first rotational-symmetry axis (162), the measurement caliper (138) comprising measurement arms (146) defining a measurement plane (180) and a measurement axis (150) in the measurement plane (180), the apparatus (102) comprising:

a chassis (104) configured to be coupled to the measurement caliper (138) so that the chassis (104) is rotatable relative to the measurement caliper (138) about a rotation axis (139) perpendicular to the measurement plane (180) and is configured to be fixed relative to the measurement caliper (138) along the rotation axis (139) and along the measurement axis (150), defined by the measurement arms (146) of the measurement caliper (138); and a component (106) configured to extend from the chassis (104), the component (106) comprising a cylindrical alignment surface (122) defining a cavity (107), the cylindrical alignment surface (122) having a second rotational-symmetry axis (123), wherein, with the chassis (104) coupled to the measurement caliper (138) and the component (106) extending from the chassis (104), the measurement arms (146) of the measurement caliper (138) protrude at least partially through the cavity (107) of the component (106) and the second rotational-symmetry axis (123) of the cylindrical alignment surface (122) of the component (106) is coplanar with the measurement plane (180) defined by the measurement arms (146) of the measurement caliper (138).

2. The apparatus (102) according to claim 1, wherein:
the chassis (104) comprises a first surface (112) and a second surface (114) facing the first surface (112);
the first surface (112) of the chassis (104) and the second surface (114) of the chassis (104) are separated by a distance D1; and
when the chassis (104) is coupled to the measurement caliper (138), the measurement caliper (138) is retained between the first surface (112) and the second surface (114) of the chassis (104) to fix the chassis (104) relative to the measurement caliper (138) along the rotation axis (139).

3. The apparatus (102) according to claim 1, wherein:
the chassis (104) comprises a circular opening (108); and
when the chassis (104) is coupled to the measurement caliper (138), a circular face portion (142) of a body (140) of the measurement caliper (138) is received by the circular opening (108) of the chassis (104) to fix the chassis (104) relative to the measurement caliper (138) along the measurement axis (150), defined by the measurement arms (146) coupled to the body (140) of the measurement caliper (138).

4. The apparatus (102) according to claim 1, wherein the component (106) is configured to be removably coupled to the chassis (104).

5. The apparatus (102) according to claim 4, wherein:
the chassis (104) comprises a component-alignment surface (121);
the component (106) comprises a chassis-alignment surface (137); and
when the chassis (104) is coupled to the measurement caliper (138) and the chassis-alignment surface (137) of the component (106) is mated with the component-alignment surface (121) of the chassis (104), the second rotational-symmetry axis (123) of the cylindrical alignment surface (122) of the component (106) is coplanar with the measurement plane (180) defined by the measurement arms (146) of the measurement caliper (138).

6. The apparatus (102) according to claim 5, wherein:
when the chassis (104) is coupled to the measurement caliper (138), at least one line coplanar with the component-alignment surface (121) of the chassis (104) is parallel to the measurement plane (180) defined by the measurement arms (146) of the measurement caliper (138); and
the chassis-alignment surface (137) of the component (106) is parallel to the second rotational-symmetry axis (123) of the cylindrical alignment surface (122) of the component (106).

7. The apparatus (102) according to claim 5, wherein the component (106) further comprises:
a tube-abutment surface (128) in the cavity (107), the tube-abutment surface (128) configured to abut an open end (160) of the tube (154); and
a chassis-abutment surface (136) configured to abut a component-abutment surface (120) of the chassis (104), wherein the tube-abutment surface (128) is spaced a distance D4 from the chassis-abutment surface (136).

8. The apparatus (102) according to claim 7, wherein, when the chassis (104) is coupled to the measurement caliper (138), the tube-abutment surface (128) of the component (106) abuts the open end (160) of the tube (154), the cylindrical alignment surface (122) of the component (106) is engaged with the exterior surface (190) of the tube (154), and the chassis-abutment surface (136) of the component (106) abuts the component-abutment surface (120) of the chassis (104), the measurement arms (146) of the measurement caliper (138) protrude a distance D2 into the tube (154) equal to a distance D3 the measurement arms (146) of the measurement caliper (138) extend past the component-abutment surface (120) of the chassis (104) minus the distance D4.

9. The apparatus (102) according to claim 7, wherein:
the component (106) comprises a first portion (181) and a second portion (182) configured to be coupled to the first portion (181); and
the first portion (181) of the component (106) comprises the cylindrical alignment surface (122) and the second portion (182) of the component (106) comprises the tube-abutment surface (128).

10. The apparatus (102) according to claim 1, wherein the cylindrical alignment surface (122) of the component (106) is configured to engage the exterior surface (190) of the tube (154) with a locational clearance fit.

11. The apparatus (102) according to claim 10, wherein, when the chassis (104) is coupled to the measurement caliper (138), the component (106) extends from the chassis (104), and the cylindrical alignment surface (122) of the component (106) is engaged with the exterior surface (190) of the tube (154), the first rotational-symmetry axis (162) of the interior surface (155) of the tube (154) is coplanar with the measurement plane (180) defined by the measurement arms (146) of the measurement caliper (138).

12. The apparatus (102) according to claim 10, wherein:
the component (106) comprises a tube-abutment surface (128) in the cavity (107); and
the tube-abutment surface (128) of the component (106) is configured to abut an open end (160) of the tube (154).

13. The apparatus (102) according to claim 12, wherein, when the chassis (104) is coupled to the measurement caliper (138), the component (106) extends from the chassis (104), the cylindrical alignment surface (122) of the component (106) is engaged with the exterior surface (190) of the tube (154), and the tube-abutment surface (128) of the component (106) abuts the open end (160) of the tube (154),
the measurement arms (146) of the measurement caliper (138) extend along the interior surface (155) of the tube (154) a distance D2 from the open end (160) of the tube (154).

14. A system (100) for inspecting an interior surface (155) of a tube (154), the interior surface (155) having a first rotational-symmetry axis (162), the system (100) comprising:
a measurement caliper (138) comprising a body (140) and measurement arms (146) coupled to the body (140) and defining a measurement plane (180) and a measurement axis (150) in the measurement plane (180), wherein the body (140) comprises a circular face portion (142);
a chassis (104) coupled to the measurement caliper (138) so that the chassis (104) is rotatable relative to the measurement caliper (138) about a rotation axis (139) perpendicular to the measurement plane (180) and is fixed relative to the measurement caliper (138) along the rotation axis (139) and along the measurement axis (150), defined by the measurement arms (146) coupled to the body (140) of the measurement caliper (138); and
a component (106) extending from the chassis (104), the component (106) comprising a cylindrical alignment surface (122) defining a cavity (107), the cylindrical alignment surface (122) having a second rotational-symmetry axis (123), wherein the measurement arms (146) of the measurement caliper (138) protrude at least partially through the cavity (107) of the component (106) and the second rotational-symmetry axis (123) of the cylindrical alignment surface (122) of the component (106) is coplanar with the measurement plane (180) defined by the measurement arms (146) of the measurement caliper (138).

15. A method (200) of inspecting an interior surface (155) of a tube (154), the interior surface (155) having a first rotational-symmetry axis (162), the method (200) comprising:

providing a chassis (104) coupled to a measurement caliper (138) so that the chassis (104) is rotatable relative to the measurement caliper (138) about a rotation axis (139) perpendicular to a measurement plane (180) defined by measurement arms (146) of the measurement caliper (138) and is fixed relative to the measurement caliper (138) along the rotation axis (139) and along a measurement axis (150), defined by the measurement arms (146) of the measurement caliper (138), wherein the measurement axis (150) is in the measurement plane (180);

providing a component (106) extending from the chassis (104), the component (106) comprising a cylindrical alignment surface (122) defining a cavity (107), the cylindrical alignment surface (122) having a second rotational-symmetry axis (123), wherein the measurement arms (146) of the measurement caliper (138) protrude at least partially through the cavity (107) of the component (106) and the second rotational-symmetry axis (123) of the cylindrical alignment surface (122) is coplanar with the measurement plane (180) defined by the measurement arms (146) of the measurement caliper (138);

inserting the measurement arms (146) of the measurement caliper (138) into the tube (154); and causing the first rotational-symmetry axis (162) of the interior surface (155) of the tube (154) and the measurement plane (180) defined by the measurement arms (146) of the measurement caliper (138) to be coplanar by aligning the second rotational-symmetry axis (123) of the cylindrical alignment surface (122) of the component (106) with the first rotational-symmetry axis (162) of the interior surface (155) of the tube (154).

16. The method (200) according to claim 15, further comprising aligning the second rotational-symmetry axis (123) of the cylindrical alignment surface (122) of the component (106) with the first rotational-symmetry axis (162) of the interior surface (155) of the tube (154) by inserting an exterior surface (190) of the tube (154) into the cavity (107) of the component (106).

17. The method (200) according to claim 15, further comprising causing the measurement arms (146) of the measurement caliper (138) to extend along the interior surface (155) of the tube (154) a distance D2 from an open end (160) of the tube (154) when a tube-abutment surface (128) of the component (106) is abutted against the open end (160) of the tube (154).

18. The method (200) according to claim 17, further comprising:

expanding the measurement arms (146) of the measurement caliper (138) in the tube (154) against the interior surface (155) of the tube (154) at the distance D2 from the open end (160); and identifying a first radial dimension (192) of the interior surface (155) of the tube (154).

19. The method (200) according to claim 18, further comprising moving the tube-abutment surface (128) of the component (106) away from the open end (160) of the tube (154) to cause the measurement arms (146) of the measurement caliper (138) to extend along the interior surface (155) of the tube (154) a distance D5 from the open end (160) of the tube (154), wherein the distance D5 is less than the distance D2.

20. The method (200) according to claim 15, further comprising causing the measurement axis (150), defined by the measurement arms (146) of the measurement caliper (138), to coaxially align with the first rotational-symmetry axis (162) of the interior surface (155) of the tube (154) by allowing the measurement caliper (138) to rotate relative to the chassis (104) when the second rotational-symmetry axis (123) of the cylindrical alignment surface (122) of the component (106) is aligned with the first rotational-symmetry axis (162) of the interior surface (155) of the tube (154) and the measurement arms (146) of the measurement caliper (138) are expanded in the tube (154) against the interior surface (155) of the tube (154).

* * * * *